US009113122B2

(12) United States Patent
Mankovitz

(10) Patent No.: US 9,113,122 B2
(45) Date of Patent: Aug. 18, 2015

(54) METHOD AND APPARATUS FOR TIME-SHIFTING VIDEO AND TEXT IN A TEXT-ENHANCED TELEVISION PROGRAM

(75) Inventor: Roy J. Mankovitz, Calabasas, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 1270 days.

(21) Appl. No.: 11/405,092

(22) Filed: Aug. 13, 2002

(65) Prior Publication Data

US 2006/0271980 A1 Nov. 30, 2006

Related U.S. Application Data

(63) Continuation-in-part of application No. 09/297,151, filed as application No. PCT/US98/08305 on Apr. 20,
(Continued)

(30) Foreign Application Priority Data

Apr. 20, 1998 (WO) ...................... PCT/US98/08305

(51) Int. Cl.
*H04N 21/4722* (2011.01)
*H04N 5/765* (2006.01)
(Continued)

(52) U.S. Cl.
CPC .................. *H04N 5/765* (2013.01); *H04N 7/16* (2013.01); *H04N 21/235* (2013.01);
(Continued)

(58) Field of Classification Search
CPC ............ H04N 21/4722; H04N 21/433; H04N 21/4333
USPC ....................... 386/46, 108, 124–126; 360/55; 725/109–110, 113–114, 133–136, 725/141–142, 153
See application file for complete search history.

(56) References Cited

U.S. PATENT DOCUMENTS 3,729,581 A 4/1973 Anderson
4,058,830 A 11/1977 Guinet et al.
(Continued)

FOREIGN PATENT DOCUMENTS

DE 3505006 A1 8/1986
DE 3621263 A1 1/1988
(Continued)

OTHER PUBLICATIONS

"Verknupfung Von TV Mit Internet", Forschung & Entwicklung, vol. 68, No. 18, Aug. 16, 1996, pp. 70-71.
(Continued)

*Primary Examiner* — Robert Hance
(74) *Attorney, Agent, or Firm* — Ropes & Gray LLP

(57) ABSTRACT

A television system allows a viewer of a text-enhanced television program to pause the program at a particular frame, browse the enhancements at his or her leisure, and then resume viewing the program from that frame, without losing continuity of the video and enhancement portions of the program, or program content. This is accomplished by time-shifting the television program for later playback. Time-shifting is accomplished through the use of mass storage devices such as semiconductor memory, optical disks, magnetic storage and other FIFO data storage structures. Markers are available that allow the viewer to return to the program at the point that he stopped watching, replaying the program from that point. Text enhancements are provided through the VBI present in a conventional television broadcast signal, through an Internet connection, or by a wireless means such as a pager or cordless telephone. Additionally a back link may be utilized to allow the viewer to summon the text enhancements or interact with the enhancements already present.

15 Claims, 8 Drawing Sheets

Related U.S. Application Data 1998, now abandoned, application No. 11/405,092, which is a continuation-in-part of application No. 10/047,940, filed on Oct. 25, 2001, now abandoned, which is a continuation of application No. 09/369,755, filed on Aug. 6, 1999, now abandoned.

(60) Provisional application No. 60/044,161, filed on Apr. 21, 1997, provisional application No. 60/052,248, filed on Jul. 11, 1997, provisional application No. 60/095,740, filed on Aug. 7, 1998, provisional application No. 60/052,248, filed on Jul. 11, 1997.

(51) Int. Cl.
*H04N 21/235* (2011.01)
*H04N 21/80* (2011.01)
*H04N 21/47* (2011.01)
*H04N 21/858* (2011.01)
*H04N 7/16* (2011.01)
*H04N 21/433* (2011.01)
*H04N 21/435* (2011.01)
*H04N 21/81* (2011.01)

(52) U.S. Cl.
CPC ........ *H04N 21/2355* (2013.01); *H04N 21/435* (2013.01); *H04N 21/4333* (2013.01); *H04N 21/47* (2013.01); *H04N 21/4722* (2013.01); *H04N 21/80* (2013.01); *H04N 21/8133* (2013.01); *H04N 21/858* (2013.01); *H04N 21/8586* (2013.01)

(56) References Cited

U.S. PATENT DOCUMENTS

| | | |
|---|---|---|
| 4,355,415 A | 10/1982 | George et al. |
| 4,488,179 A | 12/1984 | Kruger et al. |
| 4,573,072 A | 2/1986 | Freeman |
| 4,602,279 A | 7/1986 | Freeman |
| 4,685,131 A | 8/1987 | Horne |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,745,549 A | 5/1988 | Hashimoto |
| 4,751,578 A | 6/1988 | Reiter et al. |
| 4,787,063 A | 11/1988 | Muguet et al. |
| 4,833,710 A | 5/1989 | Hirashima |
| 4,847,698 A | 7/1989 | Freeman |
| 4,847,699 A | 7/1989 | Freeman |
| 4,847,700 A | 7/1989 | Freeman |
| 4,857,999 A | 8/1989 | Welsh |
| 4,866,542 A | 9/1989 | Shimada et al. |
| 4,887,152 A * | 12/1989 | Matsuzaki et al. ............... 725/76 |
| 4,890,321 A | 12/1989 | Seth-Smith et al. |
| 4,908,707 A | 3/1990 | Kinghom |
| 4,930,158 A | 5/1990 | Vogel |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 5,003,384 A | 3/1991 | Durden et al. |
| 5,027,400 A | 6/1991 | Baji et al. |
| 5,047,867 A | 9/1991 | Strubbe et al. |
| 5,093,718 A | 3/1992 | Hoarty et al. |
| 5,109,279 A | 4/1992 | Ando |
| 5,109,414 A | 4/1992 | Harvey et al. |
| 5,119,188 A | 6/1992 | McCalley et al. |
| 5,134,719 A | 7/1992 | Mankovitz |
| 5,151,782 A | 9/1992 | Ferraro |
| 5,151,789 A | 9/1992 | Young |
| 5,155,591 A | 10/1992 | Wachob |
| 5,172,413 A | 12/1992 | Bradley et al. |
| 5,200,822 A | 4/1993 | Bronfin et al. |
| 5,220,420 A | 6/1993 | Hoarty et al. |
| 5,223,924 A | 6/1993 | Strubbe |
| 5,231,493 A | 7/1993 | Apitz |
| 5,233,654 A | 8/1993 | Harvey et al. |
| 5,235,415 A | 8/1993 | Bonicel et al. |
| 5,241,428 A | 8/1993 | Goldwasser et al. |
| 5,245,420 A | 9/1993 | Harney et al. |
| 5,249,043 A | 9/1993 | Grandnnougin |
| 5,253,066 A | 10/1993 | Vogel |
| 5,253,067 A | 10/1993 | Chaney et al. |
| 5,260,778 A | 11/1993 | Kauffman et al. |
| 5,299,006 A | 3/1994 | Kim |
| 5,311,423 A | 5/1994 | Clark |
| 5,317,391 A | 5/1994 | Banker et al. |
| 5,335,277 A | 8/1994 | Harvey et al. |
| 5,339,434 A | 8/1994 | Rusis |
| 5,341,350 A | 8/1994 | Frank et al. |
| 5,353,121 A | 10/1994 | Young et al. |
| 5,357,276 A | 10/1994 | Banker et al. |
| 5,361,091 A | 11/1994 | Hoarty et al. |
| 5,367,330 A | 11/1994 | Haave et al. |
| 5,371,551 A | 12/1994 | Logan et al. |
| 5,404,393 A | 4/1995 | Remillard |
| 5,404,567 A | 4/1995 | DePietro et al. |
| 5,410,343 A | 4/1995 | Coddington et al. |
| 5,410,344 A | 4/1995 | Graves et al. |
| 5,412,720 A | 5/1995 | Hoarty |
| 5,416,508 A | 5/1995 | Sakuma et al. |
| 5,426,699 A | 6/1995 | Wunderlich et al. |
| 5,438,423 A | 8/1995 | Lynch et al. |
| 5,442,389 A | 8/1995 | Blehut et al. |
| 5,461,415 A | 10/1995 | Wolf et al. |
| 5,465,385 A | 11/1995 | Ohga et al. |
| 5,479,268 A | 12/1995 | Young et al. |
| 5,483,278 A | 1/1996 | Strubbe et al. |
| 5,485,197 A | 1/1996 | Hoarty |
| 5,485,221 A | 1/1996 | Banker et al. |
| 5,495,295 A | 2/1996 | Long |
| 5,502,504 A | 3/1996 | Marshall et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,526,034 A | 6/1996 | Hoarty et al. |
| 5,526,035 A | 6/1996 | Lappington et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,559,949 A | 9/1996 | Reimer et al. |
| 5,574,778 A | 11/1996 | Ely et al. |
| 5,576,755 A | 11/1996 | Davis et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,594,507 A | 1/1997 | Hoarty |
| 5,594,509 A | 1/1997 | Florin et al. |
| 5,594,661 A | 1/1997 | Bruner et al. |
| 5,594,779 A | 1/1997 | Goodman |
| 5,596,373 A | 1/1997 | White et al. |
| 5,600,364 A | 2/1997 | Hendricks et al. |
| 5,600,573 A | 2/1997 | Hendricks et al. |
| 5,602,582 A | 2/1997 | Wanderscheid et al. |

(56) References Cited

U.S. PATENT DOCUMENTS

| | | | |
|---|---|---|---|
| 5,606,642 A | 2/1997 | Stautner et al. |
| 5,612,742 A | 3/1997 | Krause et al. |
| 5,616,876 A | 4/1997 | Gluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Biomfield-Brown |
| 5,629,733 A | 5/1997 | Youman et al. |
| 5,629,867 A | 5/1997 | Goldman |
| 5,630,119 A | 5/1997 | Aristides et al. |
| 5,632,007 A | 5/1997 | Freeman |
| 5,635,978 A | 6/1997 | Alten et al. |
| 5,635,987 A | 6/1997 | Park et al. |
| 5,638,522 A | 6/1997 | Dunsmuir et al. |
| 5,648,813 A | 7/1997 | Tanigawa et al. |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,350 A | 8/1997 | Hendricks et al. |
| 5,659,366 A | 8/1997 | Kerman |
| 5,666,645 A | 9/1997 | Thomas et al. |
| 5,675,743 A | 10/1997 | Mavity |
| 5,682,195 A | 10/1997 | Hendricks et al. |
| 5,682,196 A | 10/1997 | Freeman |
| 5,694,163 A | 12/1997 | Harrison |
| 5,696,765 A | 12/1997 | Safadi |
| 5,696,905 A | 12/1997 | Reimer |
| 5,699,107 A | 12/1997 | Lawler et al. |
| 5,701,383 A | 12/1997 | Russo et al. |
| 5,708,961 A | 1/1998 | Hylton et al. |
| 5,710,601 A | 1/1998 | Marshall et al. |
| 5,717,452 A | 2/1998 | Janin et al. |
| 5,721,829 A | 2/1998 | Dunn et al. |
| 5,724,091 A | 3/1998 | Freeman et al. |
| 5,724,525 A | 3/1998 | Beyers, II et al. |
| 5,727,060 A | 3/1998 | Young |
| 5,732,216 A | 3/1998 | Logan et al. |
| 5,734,119 A | 3/1998 | France et al. |
| 5,734,853 A | 3/1998 | Hendricks et al. |
| 5,742,443 A | 4/1998 | Tsao et al. |
| 5,745,710 A | 4/1998 | Clanton, III et al. |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,761,606 A | 6/1998 | Wolzien |
| 5,768,528 A | 6/1998 | Stumm |
| 5,774,170 A | 6/1998 | Hite et al. |
| 5,774,664 A * | 6/1998 | Hidary et al. ............... 725/110 |
| 5,774,666 A | 6/1998 | Portuesi |
| 5,778,181 A | 7/1998 | Hidary et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,781,246 A | 7/1998 | Alten et al. |
| 5,790,198 A | 8/1998 | Roop et al. |
| 5,790,423 A | 8/1998 | Lau et al. |
| 5,793,412 A | 8/1998 | Asarnizuya |
| 5,793,971 A | 8/1998 | Fujita et al. |
| 5,794,217 A | 8/1998 | Alien |
| 5,796,952 A | 8/1998 | Davis et al. |
| 5,798,785 A | 8/1998 | Hendricks et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,246 A | 9/1998 | Goldman |
| 5,812,123 A | 9/1998 | Rowe et al. |
| 5,812,205 A * | 9/1998 | Milnes et al. ............... 348/460 |
| 5,815,145 A | 9/1998 | Matthews, III |
| 5,815,146 A | 9/1998 | Youden et al. |
| 5,818,438 A | 10/1998 | Howe et al. |
| 5,818,935 A | 10/1998 | Maa |
| 5,819,019 A | 10/1998 | Nelson |
| 5,819,160 A | 10/1998 | Foladare et al. |
| 5,822,530 A | 10/1998 | Brown |
| RE35,954 E | 11/1998 | Levine |
| 5,830,068 A | 11/1998 | Brenner et al. |
| 5,838,314 A | 11/1998 | Neel et al. |
| 5,841,979 A | 11/1998 | Schulhof et al. |
| 5,844,620 A | 12/1998 | Coleman et al. |
| 5,847,750 A | 12/1998 | Srivastava et al. |
| 5,848,352 A | 12/1998 | Dougherty et al. |
| 5,850,218 A | 12/1998 | LaJoie et al. |
| 5,861,881 A | 1/1999 | Freeman et al. |
| 5,861,906 A | 1/1999 | Dunn et al. |
| 5,881,245 A | 3/1999 | Thompson |
| 5,884,028 A | 3/1999 | Kindell |
| 5,886,707 A | 3/1999 | Berg |
| 5,886,732 A | 3/1999 | Humpleman |
| 5,887,243 A | 3/1999 | Harvey et al. |
| 5,892,915 A | 4/1999 | Duso et al. |
| 5,894,589 A | 4/1999 | Reber et al. |
| 5,896,414 A | 4/1999 | Meyer et al. |
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura et al. |
| 5,903,263 A | 5/1999 | Emura |
| 5,903,264 A | 5/1999 | Moeller et al. |
| 5,905,522 A | 5/1999 | Lawler |
| 5,905,847 A | 5/1999 | Kobayashi et al. |
| 5,909,638 A | 6/1999 | Allen |
| 5,911,046 A | 6/1999 | Amano |
| 5,913,039 A | 6/1999 | Nakamura et al. |
| 5,914,941 A | 6/1999 | Janky |
| 5,915,090 A | 6/1999 | Joseph et al. |
| 5,915,094 A | 6/1999 | Kouloheris |
| 5,916,303 A | 6/1999 | Scott |
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schafer |
| 5,922,045 A | 7/1999 | Hanson |
| 5,922,048 A | 7/1999 | Emura |
| 5,923,361 A | 7/1999 | Sutton, Jr. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,849 A | 7/1999 | Kikinis |
| 5,929,850 A | 7/1999 | Broadwin et al. |
| 5,930,473 A | 7/1999 | Tang et al. |
| 5,930,493 A | 7/1999 | Ottesen et al. |
| 5,931,901 A | 8/1999 | Wolfe et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Stahle et al. |
| 5,940,071 A | 8/1999 | Treffers et al. |
| 5,940,073 A | 8/1999 | Klosterman et al. |
| 5,943,046 A | 8/1999 | Cave et al. |
| 5,943,047 A | 8/1999 | Suzuki |
| 5,945,987 A | 8/1999 | Dunn |
| 5,947,746 A | 9/1999 | Tsai |
| 5,949,411 A | 9/1999 | Doerr et al. |
| 5,956,482 A | 9/1999 | Agraharam et al. |
| 5,959,659 A | 9/1999 | Dokic |
| 5,961,603 A | 10/1999 | Kunkel et al. |
| 5,963,202 A | 10/1999 | Polish |
| 5,964,455 A | 10/1999 | Catanzarite et al. |
| 5,969,714 A | 10/1999 | Butcher |

(56) References Cited

U.S. PATENT DOCUMENTS

| | | |
|---|---|---|
| 5,973,680 A | 10/1999 | Ueda |
| 5,973,722 A | 10/1999 | Wakai et al. |
| 5,974,217 A | 10/1999 | Haraguchi |
| 5,977,963 A | 11/1999 | Gaughan et al. |
| 5,978,567 A | 11/1999 | Rebane et al. |
| 5,978,843 A | 11/1999 | Wu et al. |
| 5,986,650 A | 11/1999 | Ellis et al. |
| 5,987,509 A | 11/1999 | Portuesi |
| 5,990,881 A | 11/1999 | Inoue et al. |
| 5,995,092 A | 11/1999 | Yuen et al. |
| 5,999,970 A | 12/1999 | Krisbergh et al. |
| 6,002,394 A | 12/1999 | Schein et al. |
| 6,002,720 A | 12/1999 | Yurt et al. |
| 6,005,564 A | 12/1999 | Ahmed et al. |
| 6,005,600 A | 12/1999 | Hill |
| 6,006,257 A | 12/1999 | Slezak |
| 6,009,465 A | 12/1999 | Decker et al. |
| 6,012,089 A | 1/2000 | Hasegawa |
| 6,012,091 A | 1/2000 | Boyce |
| 6,014,381 A | 1/2000 | Troxel et al. |
| 6,014,693 A | 1/2000 | Ito et al. |
| 6,014,694 A | 1/2000 | Aharoni et al. |
| 6,014,706 A | 1/2000 | Cannon et al. |
| 6,016,141 A | 1/2000 | Knudson et al. |
| 6,018,359 A | 1/2000 | Kermode et al. |
| 6,018,765 A | 1/2000 | Durana et al. |
| 6,018,768 A | 1/2000 | Ullman et al. |
| 6,020,912 A | 2/2000 | De Lang |
| 6,022,223 A | 2/2000 | Taniguchi et al. |
| 6,023,725 A | 2/2000 | Ozawa et al. |
| 6,025,837 A | 2/2000 | Matthews et al. |
| 6,025,868 A | 2/2000 | Russo |
| 6,028,600 A | 2/2000 | Rosin et al. |
| 6,029,064 A | 2/2000 | Farris et al. |
| 6,038,591 A | 3/2000 | Wolfe et al. |
| 6,049,539 A | 4/2000 | Lee et al. |
| 6,052,145 A | 4/2000 | Macrae et al. |
| 6,061,719 A * | 5/2000 | Bendinelli et al. ............ 709/218 |
| 6,097,383 A * | 8/2000 | Gaughan et al. ............. 715/717 |
| 6,108,042 A | 8/2000 | Adams et al. |
| 6,141,488 A | 10/2000 | Knudson et al. |
| 6,157,413 A | 12/2000 | Hanafee et al. |
| 6,157,809 A | 12/2000 | Kambayashi |
| 6,160,546 A | 12/2000 | Thompson et al. |
| 6,208,335 B1 | 3/2001 | Gordon et al. |
| 6,209,129 B1 | 3/2001 | Carr et al. |
| 6,233,389 B1 | 5/2001 | Barton et al. |
| 6,239,794 B1 | 5/2001 | Yuen et al. |
| 6,240,555 B1 * | 5/2001 | Shoff et al. .................. 725/110 |
| 6,243,129 B1 | 6/2001 | Deierling |
| 6,263,505 B1 | 7/2001 | Walker et al. |
| 6,275,268 B1 | 8/2001 | Ellis et al. |
| 6,275,989 B1 | 8/2001 | Broadwin et al. |
| 6,282,713 B1 | 8/2001 | Kitsukawa et al. |
| 6,314,575 B1 | 11/2001 | Billock et al. |
| 6,317,784 B1 | 11/2001 | Mackintosh et al. |
| 6,331,877 B1 | 12/2001 | Bennington et al. |
| 6,342,926 B1 | 1/2002 | Hanafee et al. |
| 6,349,410 B1 * | 2/2002 | Lortz ............................ 725/110 |
| 6,357,043 B1 | 3/2002 | Ellis et al. |
| 6,367,080 B1 | 4/2002 | Enomoto et al. |
| 6,415,438 B1 | 7/2002 | Blackketter et al. |
| 6,430,743 B1 | 8/2002 | Matsuura et al. |
| 6,453,471 B1 | 9/2002 | Klosterman |
| 6,460,180 B1 * | 10/2002 | Park et al. ..................... 725/40 |
| 6,483,986 B1 | 11/2002 | Krapf |
| 6,536,515 B2 | 3/2003 | Freitag et al. |
| 6,580,870 B1 * | 6/2003 | Kanazawa et al. ............ 386/240 |
| 6,591,058 B1 | 7/2003 | O'Connor et al. |
| 6,606,128 B2 | 8/2003 | Hanafee et al. |
| 6,646,685 B1 | 11/2003 | Kim |
| 6,715,126 B1 | 3/2004 | Chang et al. |
| 6,718,551 B1 | 4/2004 | Swix et al. |
| 6,771,317 B2 | 8/2004 | Ellis et al. |
| 6,802,074 B1 * | 10/2004 | Mitsui et al. ................... 725/25 |
| 6,973,669 B2 * | 12/2005 | Daniels ......................... 725/112 |
| 7,053,964 B2 | 5/2006 | Moon |
| 7,159,232 B1 * | 1/2007 | Blackketter et al. ............ 725/38 |
| 7,440,993 B1 | 10/2008 | Philyaw et al. |
| 2001/0029610 A1 | 10/2001 | Corvin et al. |
| 2002/0087981 A1 | 7/2002 | Daniels |
| 2002/0104096 A1 | 8/2002 | Cramer et al. |
| 2002/0154157 A1 | 10/2002 | Sherr et al. |
| 2002/0174430 A1 | 11/2002 | Ellis et al. |
| 2002/0194595 A1 | 12/2002 | Miller et al. |
| 2003/0066089 A1 | 4/2003 | Anderson |
| 2003/0070182 A1 | 4/2003 | Pierre et al. |
| 2003/0182659 A1 | 9/2003 | Ellis et al. |
| 2003/0182660 A1 | 9/2003 | Ellis et al. |
| 2003/0182661 A1 | 9/2003 | Ellis et al. |
| 2003/0188314 A1 | 10/2003 | Ellis et al. |
| 2003/0196203 A1 | 10/2003 | Ellis et al. |
| 2003/0204847 A1 | 10/2003 | Ellis et al. |
| 2004/0172661 A1 | 9/2004 | Yagawa et al. |
| 2006/0140584 A1 | 6/2006 | Ellis et al. |
| 2008/0181574 A1 | 7/2008 | Ellis et al. |
| 2008/0184297 A1 | 7/2008 | Ellis et al. |
| 2008/0184315 A1 | 7/2008 | Ellis et al. |

FOREIGN PATENT DOCUMENTS

| | | |
|---|---|---|
| EP | 0 424 469 | 5/1991 |
| EP | 0 572 090 | 2/1993 |
| EP | 0 535 749 | 4/1993 |
| EP | 0 624 039 | 11/1994 |
| EP | 0 662 771 | 7/1995 |
| EP | 0 682 452 | 11/1995 |
| EP | 0 711 076 | 5/1996 |
| EP | 0 725 539 | 8/1996 |
| EP | 0 758 833 | 2/1997 |
| EP | 0 763 938 | 3/1997 |
| EP | 849948 A2 | 6/1998 |
| EP | 0 854 645 | 7/1998 |
| EP | 852442 A1 | 7/1998 |
| EP | 0 872 987 | 10/1998 |
| EP | 0 874 524 | 10/1998 |
| EP | 0 924 927 | 6/1999 |
| EP | 0 986 046 | 8/1999 |
| EP | 0 944 253 | 9/1999 |
| EP | 1 170 944 | 1/2002 |
| GB | 1554411 | 10/1979 |
| GB | 2 256 115 | 11/1992 |
| GB | 2307381 | 5/1997 |
| JP | 60-61935 | 9/1985 |
| JP | 60-61935 A | 3/1994 |
| JP | 07-135621 | 5/1995 |
| JP | 7-193788 | 7/1995 |
| JP | 07-321748 | 8/1995 |
| JP | 8-168046 | 6/1996 |
| JP | 09-037223 | 2/1997 |
| JP | 9-65321 | 3/1997 |
| JP | 9-098362 | 4/1997 |
| JP | 9-102944 | 4/1997 |
| JP | 9-162818 | 6/1997 |
| JP | 10-243375 | 9/1998 |
| JP | 2000-83059 | 3/2000 |
| TW | 247388 | 10/1994 |
| WO | WO 88/04507 | 6/1988 |
| WO | WO 89/12370 | 12/1989 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO-9222983 A2 | 12/1992 |
| WO | WO 93/08542 | 4/1993 |
| WO | WO-9311640 A1 | 6/1993 |
| WO | WO 93/22877 | 11/1993 |
| WO | WO-9413107 A1 | 6/1994 |
| WO | WO-9414281 A1 | 6/1994 |
| WO | WO-9414282 A1 | 6/1994 |
| WO | WO-9414283 A1 | 6/1994 |
| WO | WO-9414284 | 6/1994 |
| WO | WO-9501058 | 1/1995 |
| WO | WO-9501059 A1 | 1/1995 |

(56) References Cited

FOREIGN PATENT DOCUMENTS

| | | |
|---|---|---|
| WO | WO-9515649 A1 | 6/1995 |
| WO | WO-9515658 A1 | 6/1995 |
| WO | WO 95/31069 | 11/1995 |
| WO | WO 95/32584 | 11/1995 |
| WO | WO 95/32587 | 11/1995 |
| WO | WO-9532583 A1 | 11/1995 |
| WO | WO-9532585 A1 | 11/1995 |
| WO | WO-9609721 A1 | 3/1996 |
| WO | WO-9613935 A1 | 5/1996 |
| WO | WO 96/17467 | 6/1996 |
| WO | WO-9617473 | 6/1996 |
| WO | WO 96/25821 | 8/1996 |
| WO | WO 96/33572 | 10/1996 |
| WO | WO 96/34467 | 10/1996 |
| WO | WO 96/34491 | 10/1996 |
| WO | WO 96/41472 | 12/1996 |
| WO | WO 96/41478 | 12/1996 |
| WO | WO 97/13368 | 4/1997 |
| WO | WO 97/19555 | 5/1997 |
| WO | WO 97/21291 | 6/1997 |
| WO | WO 97/29458 | 8/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 98/00975 | 1/1998 |
| WO | WO 98/00976 | 1/1998 |
| WO | WO 98/01995 | 1/1998 |
| WO | WO 98/06219 | 2/1998 |
| WO | WO 98/07277 | 2/1998 |
| WO | WO-98/10589 A1 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/27723 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/39893 | 9/1998 |
| WO | WO 98/47279 | 10/1998 |
| WO | WO 98/53611 | 11/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 99/27681 | 6/1999 |
| WO | WO 99/28897 | 6/1999 |
| WO | WO 99/30491 | 6/1999 |
| WO | WO 99/39466 | 8/1999 |
| WO | WO 99/45700 | 9/1999 |
| WO | WO 99/45702 | 9/1999 |
| WO | WO 99/56466 | 11/1999 |
| WO | WO 99/56473 | 11/1999 |
| WO | WO 99/57707 | 11/1999 |
| WO | WO 99/60783 | 11/1999 |
| WO | WO 99/60789 | 11/1999 |
| WO | WO 99/60790 | 11/1999 |
| WO | WO 99/65244 | 12/1999 |
| WO | WO 99/66725 | 12/1999 |
| WO | WO 00/02380 | 1/2000 |
| WO | WO 00/04706 | 1/2000 |
| WO | WO 00/05885 | 2/2000 |
| WO | WO 00/05889 | 2/2000 |
| WO | WO 00/08855 | 2/2000 |
| WO | WO 00/11869 | 3/2000 |
| WO | WO 00/16548 | 3/2000 |
| WO | WO 00/28734 | 5/2000 |
| WO | WO 00/33560 | 6/2000 |
| WO | WO 00/33565 | 6/2000 |
| WO | WO 00/78048 | 12/2000 |
| WO | WO 00/79798 | 12/2000 |
| WO | WO 01/01677 | 1/2001 |
| WO | WO 01/01689 | 1/2001 |
| WO | WO 01/19086 | 3/2001 |
| WO | WO 01/35662 | 5/2001 |
| WO | WO 01/46869 | 6/2001 |
| WO | WO 01/50743 | 7/2001 |
| WO | WO 01/58158 | 8/2001 |
| WO | WO 01/78382 | 10/2001 |
| WO | WO-02/069636 | 9/2002 |

OTHER PUBLICATIONS

"272OR Satellite Receiver User's Guide," General Instrument, 1991, pp. 58-61.

"A New Approach to Addressability," Cable Data product brochure, undated.

"Addressable Converters: A New Development at CableData," *Via Cable*, vol. 1, No. 12, Dec. 1981.

Brugliera, V., "Digital On-Screen Display—A New Technology for the Consumer Interface," *Symposium Record Cable Sessions*, 18th International Television Symposium and Technical Exhibition, Montreux, Switzerland, pp. 572-586, Jun. 10-15, 1993.

Sorce, J., et al., "Designing a Broadband Residential Entertainment Service: A Case Study," GTE Laboratories Incorporated, undated, pp. 141-148.

U.S. Appl. No. 08/900,417, filed Jul. 25, 1997 entitled "Multi-Featured Multi-Media Appliance".

CableData brochure, "A New Approach to Addressability" (undated).

Hofmann, Neumann, Oberlies, and Schadwinkel, "Videotext Programmiert Videorecorder," Rundfunktechnische Mitteilungen, Nov.-Dec. 1982, pp. 254-257 (translation abstract attached).

Matthew D. Miller, "A Scenario for the Deployment of Interactive Multimedia Cable Television Systems in the United States in the 1990's," Proceedings of the IEEE. vol. 82, No. 4, pp. 585-589 (Apr. 1994).

Yee-Hsiang Chang et al., "An Open-Systems Approach to Video on Demand," IEEE Communications Magazine, vol. 32, pp. 68-80 (May 1994).

"Electronic Programme Guide (EPG); Protocol for a TV Guide using electronic data transmission" by European Telecommunication Standards Institute, May 1997, Valbonne, France, publication No. ETS 300 707.

Patent abstract for Japanese patent JP 10 065978, Patent Abstracts of Japan, vol. 1998, No. 08, Jun. 3, 1998.

"Windows 95 Feature Combines TV, Terminal and the Internet," New York Times, Aug. 18, 1998.

The New York Times, "2 Makers Plan Introductions of Digital VCR", by John Markoff, Mar. 29, 1999.

David M. Rudnick, United States Patent Application for "Interactive Television Program Guide System Having Graphic Arrangements of Program Event Regions," filed Apr. 1, 1999, U.S. Appl. No. 09/283,681.

Patent abstract for Japanese patent JP 11 032272, Patent Abstracts of Japan, vol. 1999, No. 05, May 31, 1999.

Patent abstract for Japanese patent JP 11 205711, Patent Abstracts of Japan, vol. 1999, No. 12, Jul. 30, 1999.

"Digital Video Broadcasting (DVB); DVB specification for data broadcasting", European Telecommunications Standards Institute, Draft EN 301 192 V1.2.1 (Jan. 1999).

U.S. Appl. No. 08/900,417, filed Jul. 25, 1997, Daniels.

U.S. Appl. No. 60/270,469, filed Feb. 21, 2001, Ellis.

\* cited by examiner

METHOD AND APPARATUS FOR TIME-SHIFTING VIDEO AND TEXT IN A TEXT-ENHANCED TELEVISION PROGRAM

CROSS-REFERENCE TO RELATED APPLICATIONS

This application is a continuation-in-part of U.S. application Ser. No. 09/297,151, filed Apr. 26, 1999 now abandoned, which is a §371 application of PCT/US98/08305 Apr. 20, 1998; U.S. Provisional Application Ser. No. 60/044,161, filed Apr. 21, 1997; and U.S. Provisional Application Ser. No. 60/052,248, filed Jul. 11, 1997, the disclosures of which are all hereby fully incorporated by reference.

This application is also a continuation-in-part of U.S. application Ser. No. 10/047,940, filed Oct. 25, 2001 now abandoned, which is a continuation of U.S. application Ser. No. 09/369,755 filed Aug. 6, 1999, now abandoned, which claims the benefit of U.S. Provisional Application Ser. No. 60/095,740, filed Aug. 7, 1998; PCT Application No. PCT/US98/08305, filed Apr. 20, 1998; and U.S. Provisional Application Ser. No. 60/052,248, filed Jul. 11, 1997, the disclosures of which are all incorporated herein by reference.

BACKGROUND

The present invention is a system wherein television program-related information (PRI) is embedded in the vertical blanking interval (VBI) of a television signal for display on a viewer's television screen at the same time as the television program. The PRI is typically contained in an Internet site, the addresses for which are embedded in the television signal. The Internet site addresses may also be transmitted synchronously with, but separate from the video portion, e.g., via an interface device such as a telephone or cable modem. Typically such an "enhanced" television program consists of a display with the video portion of the program in a picture-in-picture (PIP) window and the PRI in the remaining portion of the display area of the television screen.

This PRI may be any textual or graphic information associated with the current television program. The PRI may consist of a textual display of a World Wide Web (WWW) or other Internet site address to which the viewer can choose to link to through a connection with an Internet Service Provider. Alternatively, the PRI may be contained in one or more Web pages, the addresses of which are inserted into the vertical blanking interval (VBI) and are automatically retrieved by the user's terminal and displayed on the display screen. Some examples of PRI are cast members' biographies, trivia about the show, information relating to the particular episode or scene, and closeups of information that cannot be readily seen or is hidden in the video portion of the program. Some of the PRI may be time dependent on the program. For example, the PRI may change to correspond to a particular scene or frame of the television program.

With so much information on the screen, some of which may be changing at a fairly rapid pace, it is desirable to provide the viewer the option of pausing a particular frame of a text-enhanced program display and then resume viewing the program without losing continuity of the video and PRI portions of the program or program content.

In the past fixed delays have been generated to allow broadcast editing. This has been accomplished with video recording. With the increasing availability of low cost semiconductor memory it is desirable to utilize this as a method of variability time-shifting a program. Concurrently other erasable storage means such as magnetic bubble semiconductor memory, erasable optical disks economically provide FIFO storage of large quantities of data that are advantageously utilized in the embodiments of the invention.

According to one embodiment of the invention, a television system is provided which allows a viewer of a PRI-enhanced television program to pause the program at a particular frame, examine the PRI at his or her leisure, perhaps browse through other, linked Web pages, and then resume viewing the program from that frame, without losing continuity of the video and PRI portions of the program or program content.

SUMMARY

According to one embodiment of the invention, an apparatus for time-shifting video and program related information (PRI) in an enhanced television program is provided which includes a display screen, a tuner for receiving a television signal with embedded data representative of an address for an Internet site including PRI, means for extracting the embedded data from the television signal, a memory for storing the embedded data, input means for inputting viewer commands, a time-shifting apparatus capable of simultaneously storing the television signal as it is received and outputting the stored television signal for display, means for communicating with an Internet service provider to retrieve information from the Internet site including the PRI, and a microcontroller.

The microcontroller is configured to retrieve the Internet site address from memory and retrieve the PRI from the Internet site in response to a first viewer command, generate a composite display including a television program contained in the television signal in a first portion of the display and the PRI in a second portion of the display in response to the first viewer command, control the time-shifting apparatus to store the television signal as it is received and display a still frame from the stored television signal in a first portion of the display screen in response to a second viewer command, and control the time-shifting apparatus to output the portion of the stored television signal subsequent to the still frame for display in the first portion of the display in response to a third viewer command.

According to another embodiment, a method for time-shifting video and program related information (PRI) in an enhanced television program is provided which includes the steps of receiving a television signal with embedded data representative of an address for an Internet site including PRI, extracting the embedded data from the television signal, storing the embedded data in a memory, selecting an Internet mode in response to a first viewer command, communicating with an Internet service provider to retrieve information from the Internet site including the PRI, displaying a television program contained in the television signal in a first portion of a display screen and the PRI in a second portion of the display screen, storing the television signal in a time-shifting apparatus and continuously displaying a still frame from the stored television signal in response to a second viewer command, and simultaneously displaying the television program subsequent to the still frame from the stored television signal and continuing to store the television signal as it is received in response to a third viewer command.

According to an alternate embodiment, one or more suspend flags are embedded in the television signal, and the "pause" operation wherein the television signal is stored in the time-shifting apparatus and the still frame displayed in response to detection of such a suspend flag. This feature may be deactivated such that the "pause" operation is only performed in response to a viewer command.

BRIEF DESCRIPTION OF THE DRAWINGS

The foregoing features and advantages of the invention will be better understood by referring to the following drawings.

DETAILED DESCRIPTION

Figure 1:
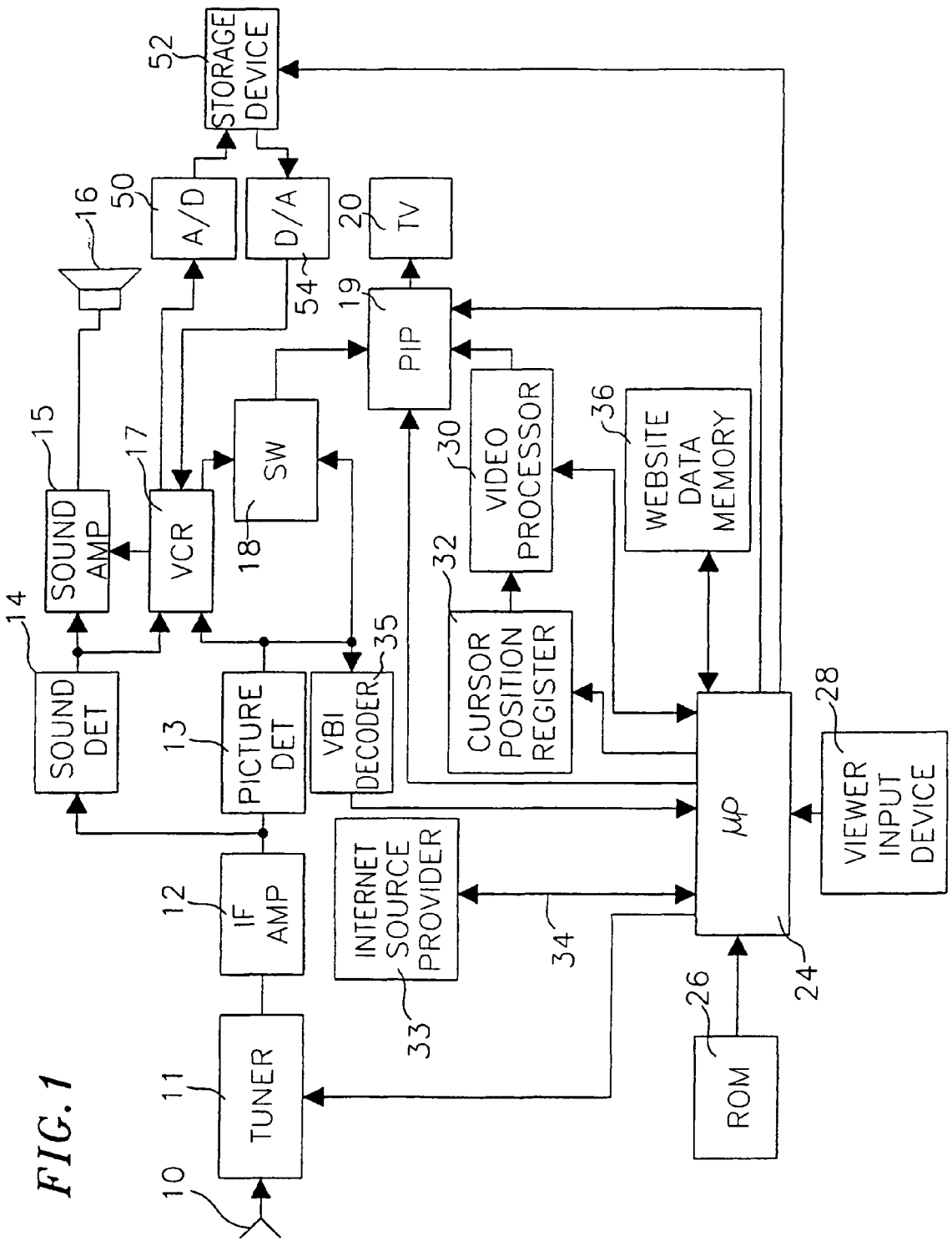
FIG. 1 is a schematic block diagram of a time-shifting apparatus according to one embodiment of the invention.

In FIG. 1, the reference numerals refer to the same elements described in application Ser. No. 08/475,395 filed on Jun. 6, 1995, the disclosure of which is incorporated fully herein by reference. In addition, the system includes 1) an Internet service provider 33 connected to microprocessor 24 by a transmission link 34 such as a telephone network or a television cable, 2) a VBI decoder 35, 3) a website data memory 36 (memory 36 could be part of the RAM of microprocessor 24 or in terms of the disclosure of the '395 application, memory 22), and 4) a digital Storage Device 52 with associate analog-to-digital and digital-to-analog converters 50, 54. An interface device such as a telephone or cable modem (not shown) couples transmission link 34 to microprocessor 24, if necessary. Internet service provider 33 is connected to an Internet backbone in well known fashion to access data at any site on the WWW.

Storage device 52 is a television signal time-shifting apparatus. One such time-shifting apparatus is disclosed in U.S. patent application Ser. No. 08/388,345 to Russo, et al. filed Feb. 14, 1995, which is fully incorporated herein. Such a time-shifting apparatus includes an optical disc for storage of video programs and separate READ and WRITE heads which operate simultaneously such that real time program information can be stored on the disc while previously stored information on the disc can be read and output to the television signal for display. Other storage media which are capable of rapidly storing extremely large amounts of information may also be used, including magnetic tape, optical disk, magneto-optical disk, or solid state memory (i.e., a high capacity charge coupled device), video RAM, etc.

The Storage Device 52 holds a large video data buffer (not shown) for storing the television program in digital form. Preferably, the Storage Device is a random access storage medium allowing concurrent reading and writing operations, so that the incoming television signal data may be written to the Storage Device while earlier stored television signal data is being read out for display on TV 20 (that is, time-shifting of the television signal data is performed). The Storage Device 52 has two heads that are separately positionable. When display of the television program is to be suspended, the read head is kept in the same position until a resume command is received. The write head, however, keeps moving to record the incoming television signal data.

To enable a television viewer to access information about a television program that the viewer is watching, PRI is embedded in the VBI of the television signal carrying the television program. For example, the PRI may be textual information regarding actors and actresses in the show, advertisements of program-related merchandise, brief descriptions of the plot of future episodes of the television program, or any other text regarding the television program, or the PRI may be text representing web pages containing such information.

Figure 2:
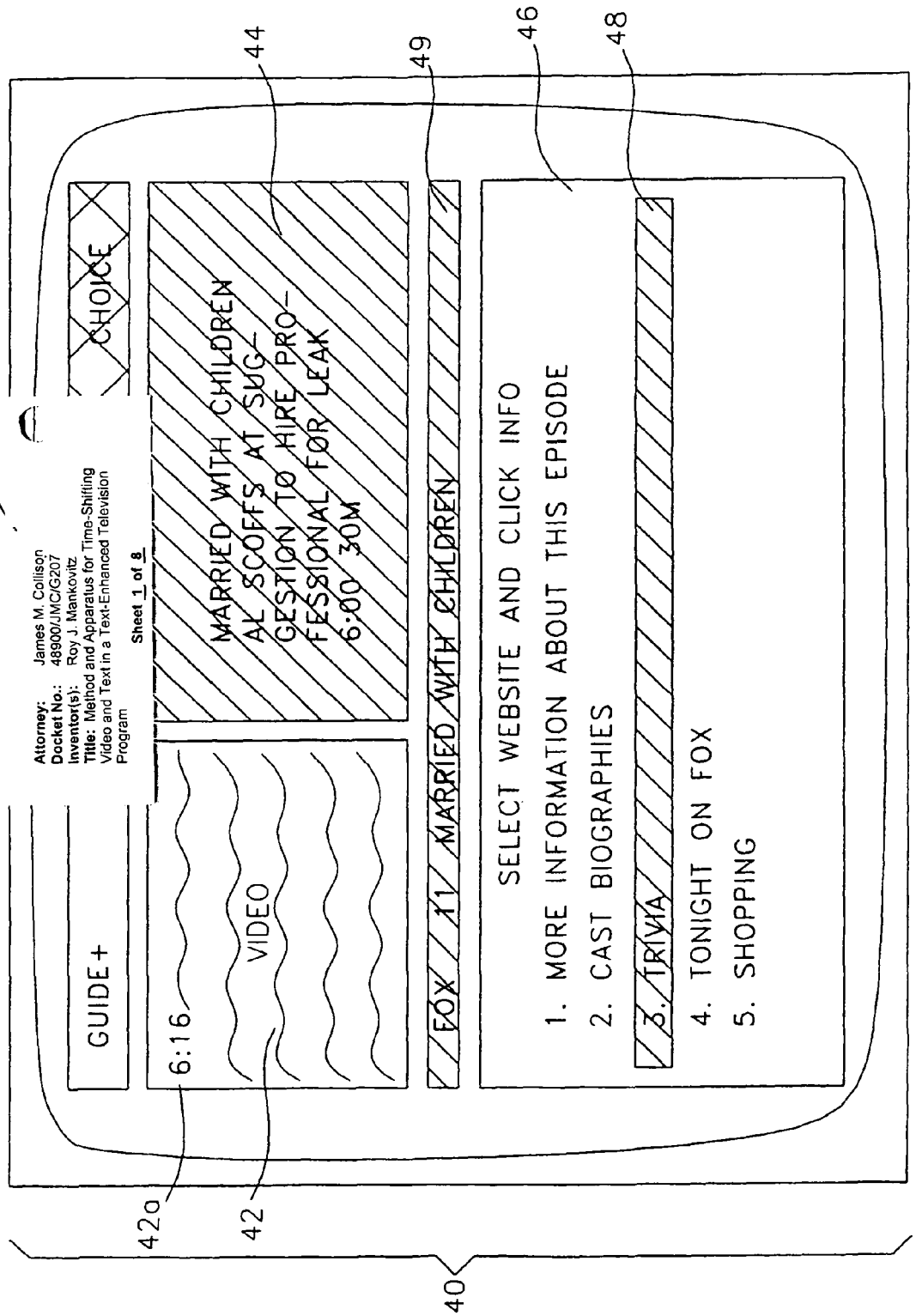
FIG. 2 is a display screen in an Internet mode of the time-shifting apparatus.

According to a preferred embodiment, the PRI is contained on a web page, the address for which is embedded in the VBI of the television signal. When the television signal carrying the program being watched is captured by tuner 11, the website data embedded in its VBI is stripped out by VBI decoder 35 and sent to microprocessor 24 for storage in website data memory 36. The memory addresses of the website names are linked to the website addresses in memory 36. An icon appears on the screen of television 20 when the television program is displayed full screen, i.e., in the TV mode, to inform the viewer that website data accompanies the television signal and is stored in memory 22. If the viewer wishes to access a website in connection with the television program, the viewer presses a button on a viewer input device 28 such as a remote controller, which introduces the Internet mode of operation shown in FIG. 2 and described below. Microprocessor 24 is programmed to carry out this operation. By repeatedly pressing a button on the viewer input device, the viewer can toggle back and forth between the TV mode and the Internet mode. Although viewer inputs are discussed herein as initiated by buttons on a remote controller, other input devices can also be used. For example, a cursor could be displayed on the television screen which is movable around the screen and a selection can be made (i.e., "clicked") when the cursor is in a desired location of the screen.

Figure 3:
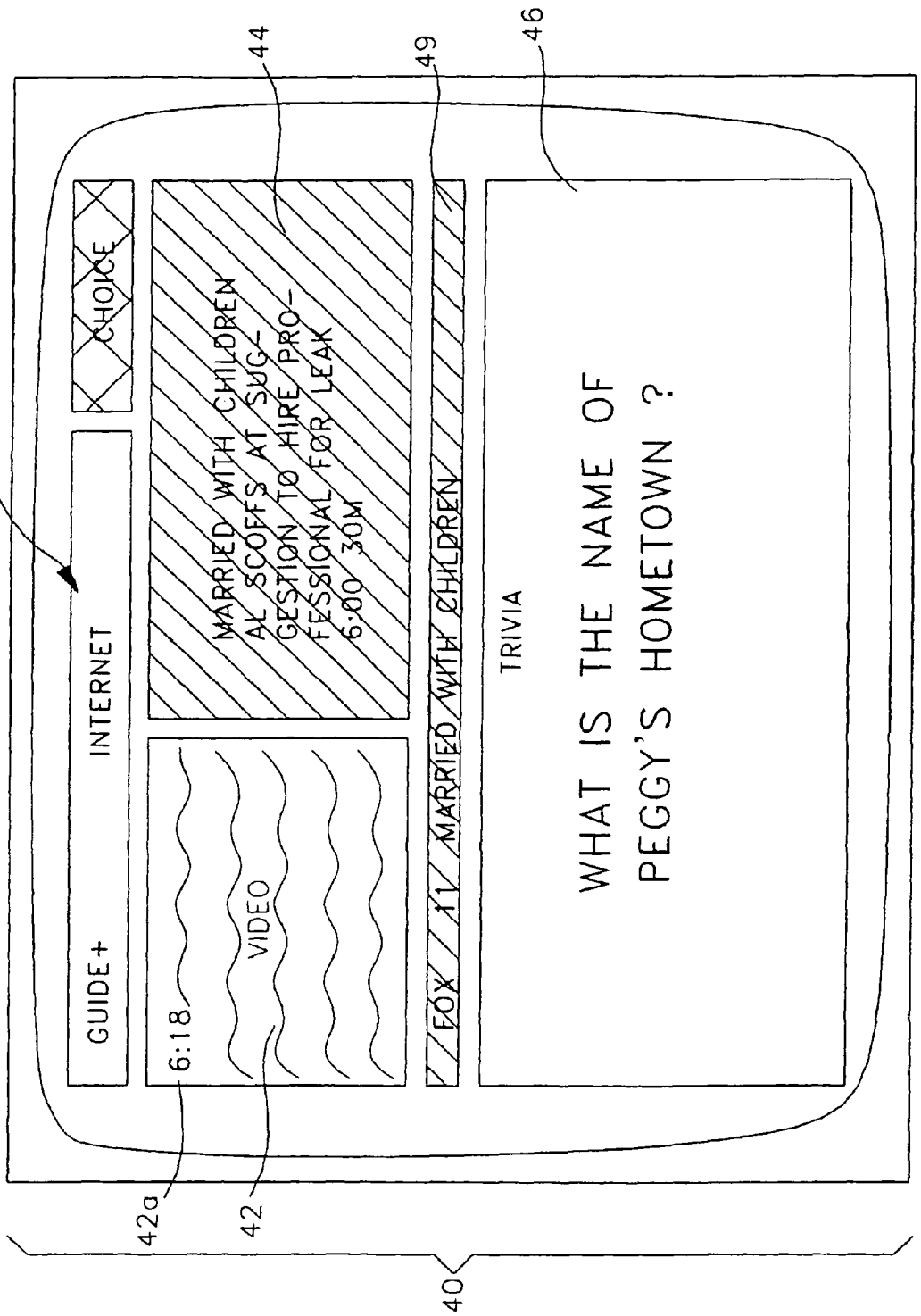
FIG. 3 is a display screen accessed by the viewer from the display screen of FIG. 2.

In the Internet mode, the video portion of the television program last viewed in the TV mode is displayed in area 42. As an option, a textual description of the program is displayed in an area 44 and information about the television program, i.e., program title, station name, and channel number are displayed in a banner 49 underneath areas 42 and 44. A message is displayed at the top of an area 46 to prompt the viewer to select from a number of website names displayed in area 46 by moving a cursor 48 with arrow keys on the viewer input device. For example, if the television program is a serial television show, for example, "Married With Children," the website names could be information related to the show. After a website name is selected, the viewer presses a button on the viewer input device. As a result, the website address to which the selected website name is linked is retrieved from memory 36 by microprocessor 24 and sent through the telephone or cable interface to Internet service provider 33. (If desired, this function of microprocessor 24 could be carried out by commercial equipment sold under the trademark WEB TV.) The information at the addressed website is downloaded from Internet service provider 33 over link 34 to microprocessor 24 and then displayed on the screen simultaneously with the television program to which the information relates, as illustrated in FIG. 3, after being composed by video processor 30. As illustrated in FIG. 3, the name of the website can be displayed above the text of the information from the website. If the television program is a serial television show, as previously stated, the displayed information could include information about the episode, cast biographies, and trivia related to the show. The viewer then navigates about the website in the manner dictated by the viewer's software to find the desired information.

Figure 4:
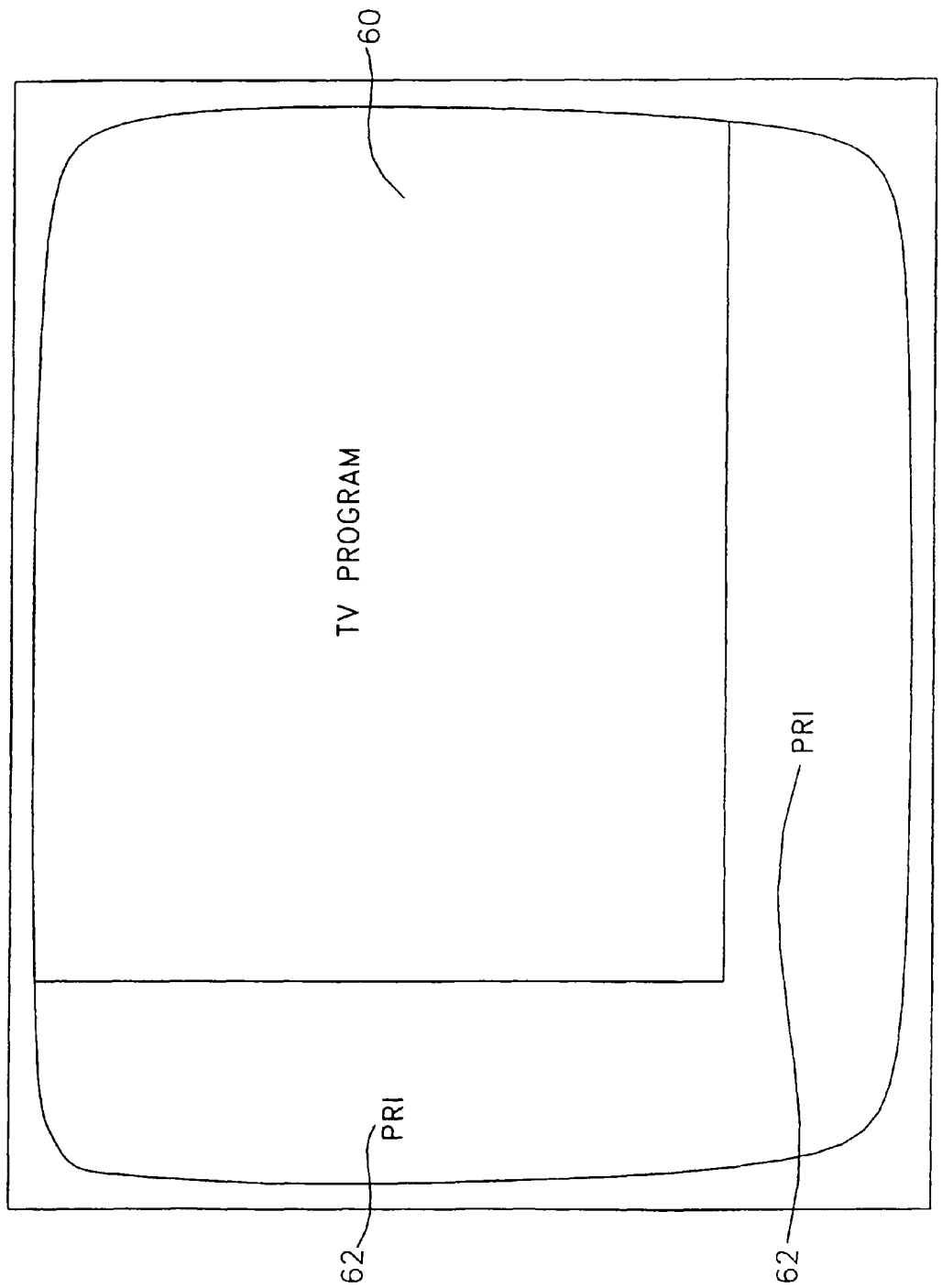
FIG. 4 is an alternate layout of the display screens of FIGS. 2 and 3.

An alternative layout of the television screen for the present invention is shown in FIG. 4. In this layout, the television program is displayed in a majority portion 60 of the screen while the PRI is displayed along two border regions 62. The Web page including the PRI can be specifically configured to display the PRI in the border regions and an area designated for the real time image in the PIP. The PIP circuitry 19 is specially configured to a smaller reduction ratio, for example 1.5:1 rather than 3:1 for a standard PIP, in order to produce the larger PIP display.

The screen portion 60 displays a television program consisting of moving images. Referring back to FIG. 1, when the viewer interacts with the website data or other PRI displayed on the television screen, the viewer's attention is diverted from the television program being shown to the website data. The viewer is then missing what is happening in the television program until the viewer's interaction with the PRI is concluded. To overcome this situation, an additional component, Storage Device 52, described above, is added to the system to "time-shift" the display of the television program. As the television signal is being received by Tuner 11, the signal is forwarded through IF Amp 12 and Picture DET 13 to VCR 17. The VCR sends the signal through an analog to digital converter (A/D) 50 to Storage Device 52. The Storage Device is under the control of the Microprocessor 24 and is capable of storing the incoming television signal in real-time as digital information for future use.

As the television signal is being stored, if a viewer wants to interact with the PRI such as website data or other textual information being displayed on the television screen, the viewer sends a command to the microprocessor 24 via the viewer input device 28. The viewer action to send the command could, for example, consist of pushing a button on the viewer input device. In response, the microprocessor 24 controls VCR 17 to output the television signal to the Storage Device 52 which begins storing the television signal, including the PRI information embedded in the VBI. The Storage Device 52 simultaneously outputs the first stored frame of the video signal to the signal processing unit for extended display on television 32. The television 32 continues to display this frame until controlled by the viewer to continue without effect on any viewer activity with the PRI shown in the remainder of the display screen. The viewer then interacts with the PRI as described above.

When the viewer is done interacting with the PRI, the viewer sends a command to the microprocessor 24 to resume display of the television program. However, instead of displaying the incoming television signal from Tuner 11, the VCR directs the delivery of the stored television signal data output from the READ head of Storage Device 52 through Digital-to-Analog Converter (D/A) 54 and SW 18 to PIP 19 for display on TV 20. The data displayed is that part of the television program immediately subsequent to the point of suspension. That is, it has been time-shifted. The incoming television signal data continues to be stored by the WRITE head of the Storage Device 52 in a time-ordered manner regardless of the functioning of the READ head. In other words, when display of the television program is to be suspended, the READ head is kept in the same position until a resume command is received. The WRITE head, however, keeps moving to record the incoming television signal data. Hence, at this time the data being stored is not the same data that is being displayed; there is a time lag between the two sets of data. In this manner, the viewer may continue watching the program without losing continuity of the program or PRI content. The viewer can position a cursor and enter input to freeze the display of the television program image on command.

In another embodiment, the PRI is contained on several web pages, each corresponding to a particular portion of the program and transmitted chronologically throughout the duration of the program. The television signal including the embedded website addresses is stored on the Storage Device 52 and hence the corresponding Web pages remain linked to the appropriate portion of the television program as the signal is read out from the Storage Device 52 after a "pause" operation. In this manner, the viewer may continue watching the program without losing continuity of the program or PRI content.

The audio portion of the television signal is also stored in the Storage Device along with the video portion. When the live television program is put into a "freeze" frame state, the audio portion of the television program is also suspended and not transmitted to the viewer. Instead, the audio portion is stored. When display of the suspended television program is resumed, the audio data is obtained from the Storage Device along with the video portion and forwarded by VCR 17 through Sound Amp 15 and loudspeaker 16 to the viewer.

In another embodiment, the television signal is already in digital form, such as for high-definition digital television (HDTV). Therefore, an analog to digital conversion is unnecessary. The Storage Device continuously stores the television signal in a wraparound fashion whenever the system is operational, overwriting the oldest previously stored television signal data when the Storage Device becomes full. The Storage Device should be large enough to hold two to three hours of television programming before overwriting earlier broadcast television signal data.

The present invention allows a viewer to interrupt his or her viewing of a television program to interact with PRI carried in the VBI of the television signal and displayed on the television screen, and yet rejoin the television program at a later point in time without missing any of the program.

In another embodiment, the display of the incoming television signal may be suspended automatically by inserting a suspend flag into the VBI, rather than by an explicit action by the viewer. When the suspend flag is detected by the microprocessor 24 after decoding by VBI decoder 35, the microprocessor instructs the VCR via a control link (not shown) to suspend the current display of the television signal. Resumption of display of the television program is commenced by viewer input. The viewer could also override the automatic suspension feature provided by the suspend flag by setting a predetermined control value to override all automatic suspend flags, or by entering viewer input when the suspension activity occurs in order to rapidly rejoin the television program in progress. Alternatively, a resume flag is inserted into the VBI at a predetermined time after the suspend flag. When the resume flag is received, the microprocessor automatically controls the VCR to resume display of the television program.

According to yet another embodiment, the viewer may access the information as any other storage media, such as a video tape, and pause, rewind, or fast forward to different portions of the program stored on the disc after the initially "pause" command. It may be desirable to continuously record the program on the time-shifting apparatus 46 regardless of a viewer "pause" command to allow for these functions over a period of time, limited only by the storage capacity of the time-shifting device.

Text-enhanced television programs incorporate program-related information (PRI) consisting of text and graphics which may be displayed simultaneously with the regular video portion of the television program in an enhancement mode. For example, the enhancement mode of one type of text-enhanced television program consists of a display with the video portion of the program in a picture-in-picture (PIP) window and textual information and/or graphics, also referred to as the "enhancements," in the remaining portion of the display area of the television screen.

Typically, the enhancements are inserted into the vertical blanking interval (VBI) of the television signal and transmitted simultaneously with the video signal. The enhancements may also be transmitted synchronously with, but separate from the video portion, e.g., via an interface device such as a telephone or cable modem. The enhancements may include cast members' biographies, trivia about the show, information relating to the particular episode or scene, and closeups of information that cannot be readily seen or is hidden in the video portion of the program.

To provide maximum flexibility in the use of the invention with various hardware configurations various embodiments of the invention incorporate menu selection. Enhanced information displayed with a video signal that utilizes picture in picture technology requires a more sophisticated and flexible programming interface than is typically available on the front panel of the television or through the remote control device. Such a enhanced display is particularly amenable to the use of an interface such as an electronic program guide (EPG). EPGs are used to view program listings, supplemental information and to facilitate the recording of television broadcasts as well as any other function that may be programmed into the guide. These guides provide a flexible means of implementing the features of the present invention in addition to the other functions enumerated. Such a guide is described in PCT Publication No. WO 99/04561, published Jan. 28, 1999, the disclosure of which is incorporated fully herein by reference.

Enhancements that convey information may be taken directly from the Internet, such as in WebTV. WebTV allows the enhancements to be displayed on the screen as previously described. However, the enhancements are web pages that are taken from the Internet and displayed on the television screen in coordination with the televised programming. These enhancements may be automatically displayed when triggered by the television program, or they may remain hidden until the viewer initiates their display. The web pages displayed may remain in place till the viewer makes a new selection, or the web pages displayed may change when triggered by a new web page address sent along with the video signal.

Figure 5:
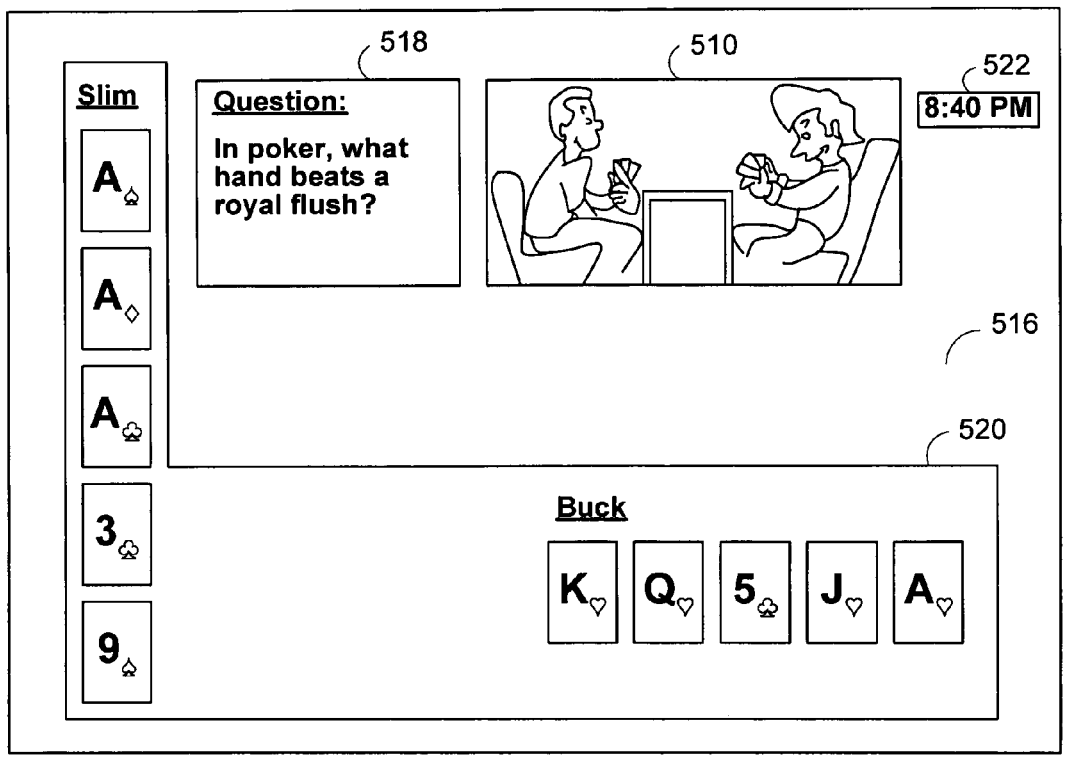
FIG. 5 is an exemplary screen of an enhanced televsion program.

Some enhancements may be time dependent on the program. For example, the enhancements may change to correspond to a particular scene or frame of the television program, such as in the exemplary screen of an enhanced television program shown in FIG. 5. The display includes a video portion 510 in a PIP window 514, depicting a scene in which two characters are playing poker, and an enhancement portion 516. The enhancement portion includes a query 518 about the rules of poker and a closeup 520 showing each player's hand at that particular time, which is shown on a clock 522 to be 8:40 pm.

Figure 6:
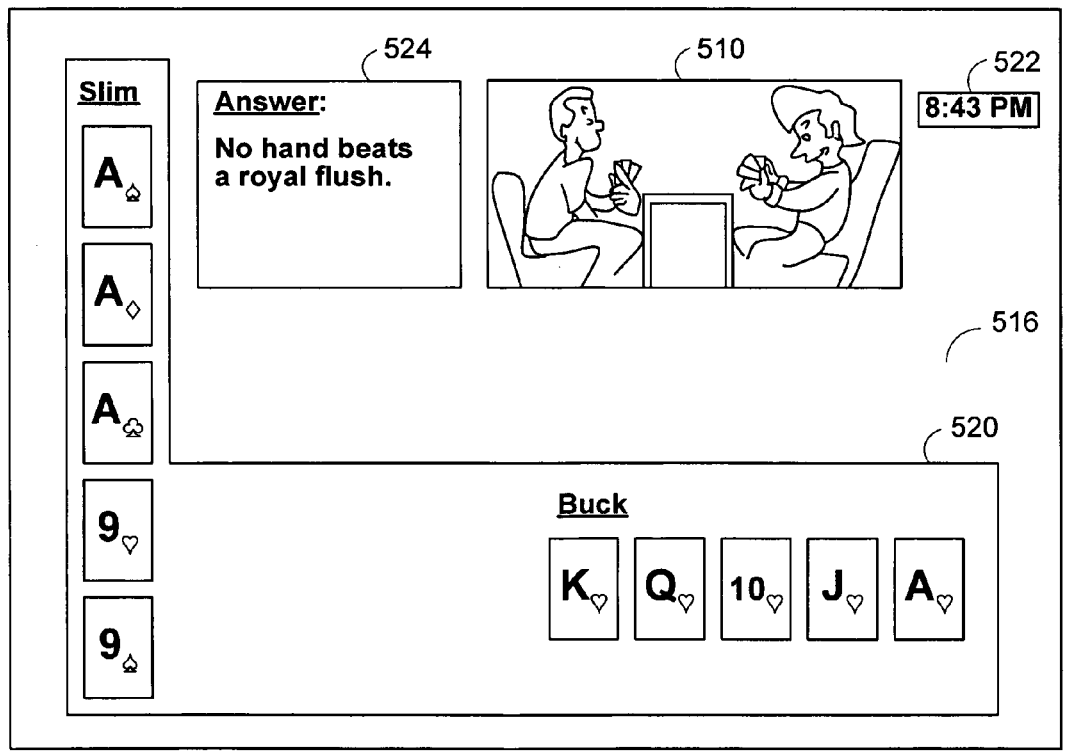
FIG. 6 is the exemplary screen of FIG. 5, but at a later time.

FIG. 6 shows a later frame of the same scene, 8:43 pm according to clock 522. The players have exchanged cards and their new card hands are shown in closeup area 520. The enhancement portion 516 also includes an answer 524 to query 518 of FIG. 5.

With so much information on the screen, some of which is changing at a fairly rapid pace, it is desirable to provide the viewer the option of pausing a particular frame of a text-enhanced program display and then resume viewing the program without losing continuity of the video and enhancement portions of the program or program content.

For example, if the viewer desires to spend some time viewing the web page information displayed it is desirable to freeze the television program being viewed in the PIP window, while the viewer peruses the web information on the main screen. However, in the current state of the art if the viewer freezes the frame, or closes the PIP window, of the television program he will miss programming broadcast during the time he spent viewing the web pages. Thus, it is desirable to provide a buffer circuit that will store the received broadcast from the time the frame was frozen. The result is that the viewer will resume viewing a time shifted program from the point where he became distracted.

Figure 7:
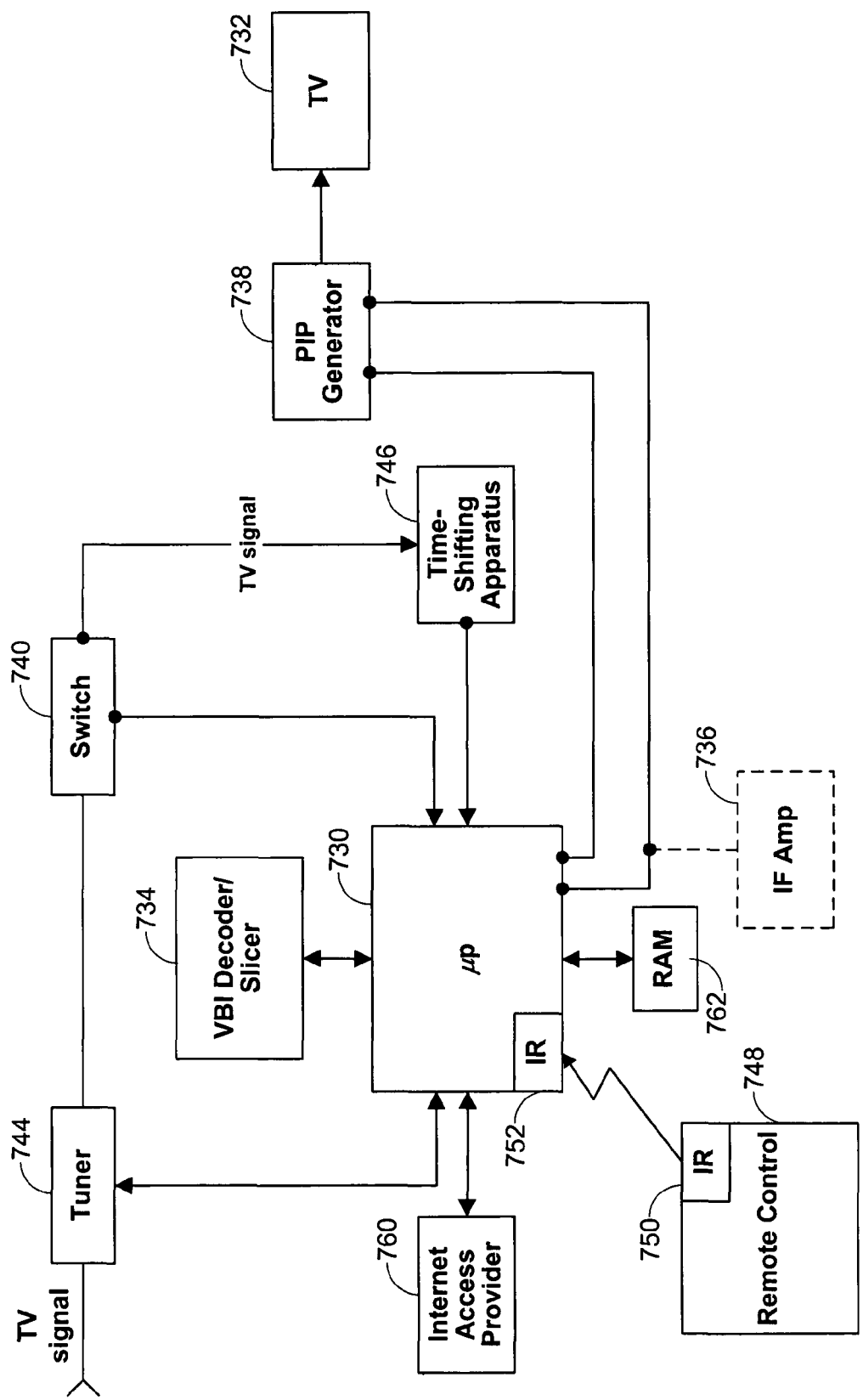
FIG. 7 is a block diagram of an apparatus that implements the time shifting of a television program and PRI.

FIG. 7 shows an apparatus that will implement time-shifting of the television program and PRI. If the PRI automatically triggers the display of a web page it is desirable to delay the triggering of this data's display so as not to disturb the viewers perusal of the web page currently displayed. In FIG. 7 the time-shifting apparatus 746 receives the composite video signal containing supplemental data or web page locations to control sequencing and accessing web data through the Internet access provider 760. In the normal viewing mode the time-shifting apparatus is either bypassed with a switch 740 or, alternatively by passing the data through the time-shifting device without delay being introduced.

The time-shifting apparatus is typically configured as a first-in first-out (FIFO) buffer. FIFO buffers are readily available as semiconductor devices. The state of the art in FIFO design has advanced to such a point where large quantities of data may be stored economically in the semiconductor devices. Up to seven hours of video data may be stored in this manner.

A FIFO memory chip stores data in binary form. A digital television signal is easily and directly stored in a FIFO memory buffer without additional signal processing. The FIFO of the time-shifting apparatus is configured such that each picture frame is stored at an address location in the buffering chip. When the readout of the memory is commanded this occurs frame-by-frame.

In the case of the television signal being a conventional analog or NTSC signal the time-shifting apparatus must first digitize the received channel so that it may be stored in digital form. Digitization is accomplished with A/D converters that convert an analog signal to a series of samples whose magnitudes are quantified as a number, typically binary. However, the quantification may be done in any convenient base, as will be appreciated by those skilled in the art In alternative embodiments of the invention multiple tuners and time-shifting apparatus may be provided so that a user may program several alternatives for an evening's viewing of different channels, and view them in an uninterrupted manner when switching among channels. In this manner if the next show to be viewed that has been time shifted proves uninteresting, one or more time shifted alternative programs is available. If multiple time shift devices are available for each programmed channel the viewer can back up to the beginning of the time slot and switch to an alternate program without missing the beginning. Alternatively, a signal tuner may be preprogrammed to tune to various channels at various times thus providing a continuous signal to a single time-shifting apparatus for time shifted viewing of a preprogrammed series of programs.

In an embodiment of the time-shifting apparatus the FIFO may consist of EEPROMs. These are memory chips that are electrically erasable programmable read-only memories (EEPROMs). These memory devices have an internal switch on the chip that permits the user to electrically rewrite new contents into the memory when desired. These circuits provide nonvolatile and re-programmable random word access memory.

In alternative embodiments of the invention the time-shifting apparatus may also supplement its memory capacity by using secondary memory. High capacity memory that has a slower access speed has been traditionally provided by disk drives and tape drives as secondary memory. These secondary memory options may be used alone to provide time-shifting of programming or may be used in conjunction with semiconductor buffers. The semiconductor buffers may be used to provide a small time period of storage with the secondary memory being used to augment the capacity of the semiconductor memory. The amount to which secondary memory use is desirable in a system is dependent upon the cost and performance trade offs required in the design, and will be readily appreciated by those skilled in the art of electronic design.

Recently optical recording has been replacing magnetic storage media. They may be used as a disposable media. Once the disk is full it is discarded. A laser beam is used to burn pits in the recording media that represent bits of information. A lower power laser beam is used to sense the presence or absence of pits in reading the disk. However, this media is not inherently erasable and discarding the disk is undesirable, unless one is provided with large capacity.

Alternative embodiments utilize erasable optical disks. These disks utilize magneto optic technology. In this technology a magnetic domain of approximately 1 μm in diameter is switched up or down by an external magnetic field after application of a laser beam that heats the domain reducing its coercivity, thus allowing the domain to flip state. The disk is read by a low power polarized laser beam that is rotated slightly depending upon whether the domain is magnetized up or down.

FIFOs may be alternatively provided by semiconductor bubble memory devices. These are chips but differ from other semiconductor memories by utilizing magnetic devices. In these devices the presence of absence of a magnetic domain is the basis for reading a binary 1 or 0. These memories are compact and extremely fast.

According to one embodiment of the invention, a television system is provided which allows a viewer of a text-enhanced television program to pause the program at a particular frame, browse the enhancements at his or her leisure, and then resume viewing the program from that frame, without losing continuity of the video and enhancement portions of the program or program content.

When viewing a time shifted program that is being played back through the buffer a subscriber may wish to fast forward through the time shifted program so that its ending time will roughly correspond to the end time that was originally scheduled. This may be achieved in several ways. To do this an embodiment allows the frames to be played back at a faster rate than is normal is utilized, with or without audio. In a further alternate embodiment the rate of frame playback is kept the same. However one or more frames are skipped during the playback. When skipping frames the supplemental data or web addresses that correspond to a skipped frame are either assigned to the previous or preceding frame, so that the web address is not lost. In a further alternate embodiment play back is sped up by eliminating commercials and station breaks that are provided with markers that indicate when skipping should occur.

The viewer may also introduce markers in alternative embodiments of the invention. By pushing a button on the remote a marker is introduced where the viewer desires, such as where he desires to begin perusing web information. A marker may also be introduced when he finishes to mark where the viewer's attention returned to the television program. Rapid frame advance may be used between these markers to determine if anything good has been missed, or to go back to where the viewer lost the plot and begin watching from that point.

In an embodiment illustrated in FIG. 7, the enhancements are inserted into the VBI of the television signal and are synchronized with the video portion of the signal. A microprocessor 730 controls a signal processing unit for extracting the enhancement information from the VBI and processing both the video signal and enhancement information for display on a television 732. The signal processing unit includes a VBI decoder/slicer 734, an IF amp 736, and a PIP generator 738.

The microprocessor also controls a switch 740. The television signal is input to the switch directly from a tuner 744. The microprocessor controls the switch to route the television signal directly to the signal processing unit, or to a time-shifting apparatus 746.

An exemplary time-shifting apparatus is described in application Ser. No. 08/475,395 filed on Jun. 6, 1995, and PCT Publication No. WO 98/48566 published Oct. 20, 1998, the disclosures of which are incorporated fully herein by reference.

One such exemplary time-shifting apparatus is disclosed in U.S. patent application Ser. No. 08/388,345 to Russo, et al. filed Feb. 14, 1995, which is fully incorporated herein. Such a time-shifting apparatus includes an optical disc for storage of video programs and separate READ and WRITE heads which operate simultaneously such that real time program information can be stored on the disc while previously stored information on the disc can be read and output to the television signal for display.

Another type of time-shifting apparatus is disclosed in U.S. Pat. No. 5,241,428 to Goldwasser, which is also fully incorporate herein. Any time-shifting apparatus capable of simultaneously storing new information and outputting previously stored information for display is acceptable for use with the various embodiments of the invention.

When the viewer presses a "PAUSE" button (not shown) on a remote controller 748, the remote controller 748 sends a command signal via an IR transmitter 750 to the IR receiver 752 of microprocessor 730.

In response, the microprocessor 730 controls switch 740 to output the television signal to time-shifting apparatus 740 which begins storing the television signal, including the enhancement information embedded in the VBI. The time-shifting apparatus simultaneously outputs the first stored frame of the video signal to the signal processing unit for extended display on television 732. The television 732 continues to display this frame until controlled by the viewer to continue. When the viewer wishes to resume viewing the program, the viewer presses a "PLAY" button (not shown) on the remote controller which in turn commands the microcontroller to control the time-shifting apparatus to begin reading the stored program from the point of the paused frame, while simultaneously continuing to record the real time broadcast television signal. In this manner, the viewer may continue watching the program without losing continuity of the program or program content.

Figure 8:
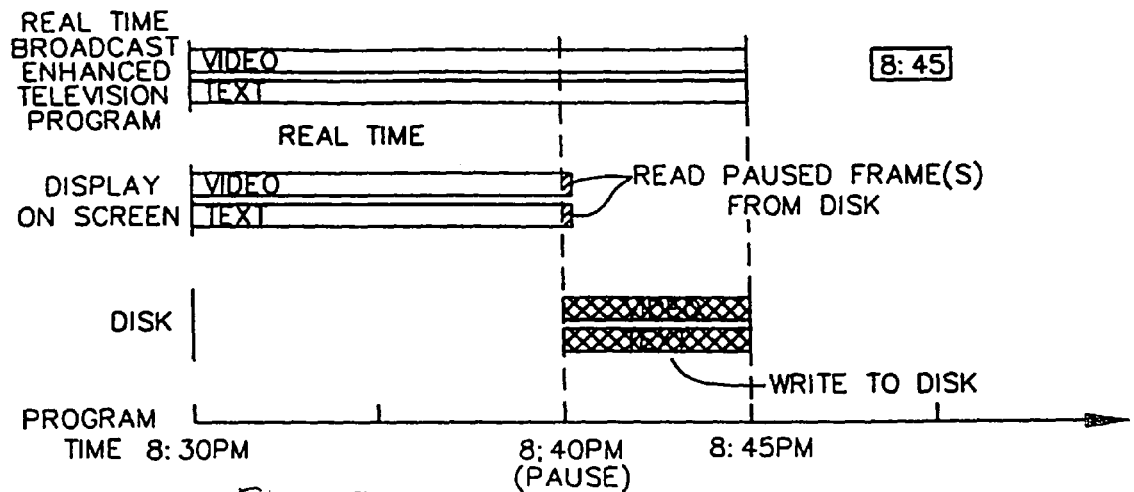
FIG. 8 is a time plot illustrating an exemplary pause operation.
Figure 9:
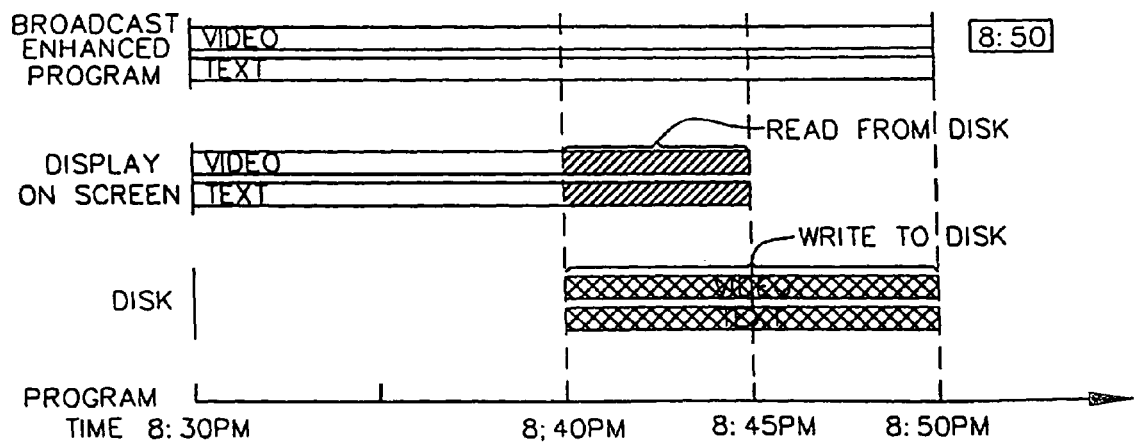
FIG. 9 is a time plot illustrating systems operation at a later time.

FIG. 8 is a time plot illustrating an exemplary "pause" operation. FIG. 8 represents system operations from 8:30 pm to 8:45 pm. From 8:30 pm to 8:40 pm, the viewer watches a text-enhanced television program in real time. At 8:40 pm, the viewer pauses the program, at which time the time-shifting apparatus begins recording the real time broadcast signal and outputs the first stored frame for display on the television 32. At 8:45 pm, the viewer controls the system to resume the program at which time the first frame is played back at the desired rate. As shown in FIG. 9, which depicts systems operations from 8:30 pm to 8:50 pm. between 8:40 pm and 8:50 pm, the television has displayed the portion of the program broadcast between 8:40 and 8:45 and the time-shifting apparatus has stored the portion of the program broadcast between 8:40 pm and 8:50 pm.

In another embodiment, the microprocessor is connected to an Internet access provider 760 (FIG. 7). According to this embodiment, the enhancement portion of the television signal includes an Internet site and/or world wide web site addresses which may be displayed on the screen and accessed in an interactive manner by the viewer. The actual Internet site address may be displayed on the screen or a representative icon or name for the site. In this manner, the enhancement information transmitted with the video portion of the program may be linked to related Internet sites. The viewer may access such Internet links from the enhancement portion of the television display at any time the link is shown, even while paused. The Internet sites accessed from the enhancements may be themselves linked to other Internet or web sites.

Figure 10:
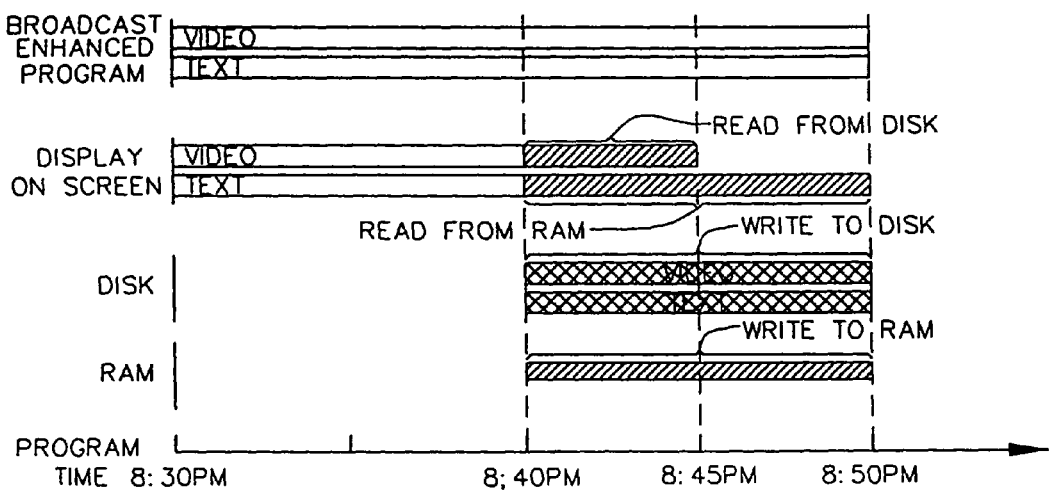
FIG. 10 is a time plot illustrating all enhancement information being extracted from the VBI and stored in RAM regardless of time-shifting apparatus operation.

In a further embodiment, the enhancement information includes internal links. For example, in FIG. 6, answer 524 may be linked to query 518 such that when the viewer selects answer 524 with a cursor (not shown), query 518 would reappear, e.g., in order to remind the viewer what the question was. In this embodiment, the microprocessor 730 is connected to a RAM 762 (FIG. 7). The real time broadcast signal is continuously routed to the microprocessor and all enhancement information extracted from the VBI is stored in the RAM, regardless of whether or not the time-shifting apparatus 746 is operating, as illustrated in FIG. 10. Thus, while watching a time shifted text-enhanced program, the viewer is able to link to enhancement information broadcast prior or subsequent to the particular frame currently displayed.

Alternatively, all enhancement information may be transmitted en masse at the beginning of the program and stored in the RAM for future reference.

According to yet another embodiment, the viewer may access the information as any other storage media, such as a video tape, and pause, rewind, or fast forward to different portions of the program stored on the disc after the initially "pause" command. It may be desirable to continuously record the program on the time-shifting apparatus 46 regardless of a viewer "pause" command to allow for these functions over a period of time, limited only by the storage capacity of the time-shifting device.

In alternative embodiments the enhancements to the television signal may be transmitted by other means than the vertical blanking interval (VBI). The television signal would contain a trigger signal to initiate the transmission of information. Such a signal typically consists of pilot tones in the case of analog transmission, or a digital preamble in the case of a HDTV signal being digitally modulated. This information thus triggered may be transmitted over a modem connected to the microprocessor or via a wireless communications link, such as by a pager, cellular telephone, or cordless telephone. Additionally the supplemental information may be stored in the memory 762 for use at a later time.

In alternative embodiments the television signal may be provided by an Internet access provider. Such an Internet service provider (ISP) may also include supplemental information in the form of web addresses. In this case a back-link may be provided through a modem, cordless telephone, pager, or cellular telephone to control time shifted playback of the television signal.

When an ISP is part of the system configuration the ISP's server may be utilized as a primary or secondary storage location of time shifted programming. Received programming that has been digitized may be sent over a back link to the ISP for storage and subsequent retrieval by the viewer from the server.

In an alternative embodiment, if streaming video is being broadcast over the Internet then the bit stream may be routed through the time-shifting buffer to realize the same benefits as previously described. In this embodiment the shifting of the buffer is used to augment the time-shifting capabilities of the streaming technology.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

The invention claimed is:

1. An apparatus for time-shifting video and program related information (PRI) in an enhanced television program, comprising:
    a tuner for receiving a video signal including a trigger and a suspend flag;
    a time-shifting apparatus capable of simultaneously storing the video signal as it is received and outputting a previously stored video signal for display; and
    a microcontroller configured to:
        receive the trigger and the suspend flag in the video signal;
        in response to receiving the trigger, launch, without user input, an application to retrieve PRI from an Internet site;
        generate a composite display including a video program contained in the video signal in a first portion of a display screen and the PRI in a second portion of the display screen; and
        instruct the time-shifting apparatus to store, without user input, the video signal as it is received and display a still frame from the stored video signal in the first portion of the display screen in response to the suspend flag received in the video signal.

2. The apparatus of claim 1 wherein the time-shifting apparatus is an optical disc.

3. The apparatus of claim 1 wherein the time-shifting apparatus is a solid state memory.

4. The apparatus of claim 1 wherein the PRI comprises text and graphics related to the television program.

5. The apparatus of claim 4 wherein the PRI comprises a plurality of website addresses.

6. The apparatus of claim 5 wherein the microcontroller is further configured to retrieve information from one of said plurality of website addresses in response to a viewer command.

7. The apparatus of claim 1 wherein the first portion of the display screen covers a minor portion of the display screen and the second portion of the display screen covers a major portion of the display screen.

8. The apparatus of claim 1 wherein the first portion of the display screen covers a major portion of the display screen and the second portion of the display screen covers a minor portion of the display screen.

9. The apparatus of claim 1 wherein the microcontroller is further configured to communicate with an internet service provider through a modem.

10. A method for time-shifting video and program related information (PRI) in an enhanced television program, comprising:
   receiving a video signal including a trigger and a suspend flag;
   receiving the trigger and the suspend flag in the video signal;
   in response to receiving the trigger, launching, without user input, an application to retrieve PRI from an Internet site;
   generating for display a video program contained in the video signal in a first portion of a display screen and the PRI in a second portion of the display screen; and
   storing, without user input, the video signal in a time-shifting apparatus and continuously displaying a still frame from the stored video signal in response to the suspend flag received in the video.

11. The method of claim 10 wherein the PRI comprises a plurality of website addresses and further comprising the steps of:
   selecting one of the plurality of website addresses in the PRI;
   retrieving information from the selected website address; and
   generating for display the information from the selected website address.

12. A method for time-shifting video and program related information (PRI) in an enhanced television program, comprising the steps of:
   receiving a video signal including a trigger and a suspend flag;
   receiving the trigger and the suspend flag in the video signal;
   in response to receiving the trigger, launching, without user input, an application to retrieve PRI from an Internet site;
   generating for display a video program contained in the video signal in a first portion of a display screen and the PRI in a second portion of the display screen;
   detecting the suspend flag in the video signal; and
   storing, without user input, the video signal in a time-shifting apparatus and continuously displaying a still frame from the stored video signal in response to receiving the suspend flag.

13. A method for time-shifting video and program related information (PRI) in an enhanced television program, comprising:
   receiving a video signal;
   receiving a trigger and a suspend flag in the video signal;
   in response to receiving the trigger, launching, without user input, an application to retrieve PRI; and
   generating for display a video program contained in the video signal in a first portion of a display screen and the PRI in a second portion of the display screen; and
   storing, without user input, the video signal in a time-shifting apparatus and continuously displaying a still frame from the stored video signal in response to the suspend flag received in the video, wherein the suspend flag is not the PRI.

14. The method of claim 13 wherein the PRI comprises a plurality of web site addresses and further comprising the steps of:
   selecting one of the plurality of web site addresses in the PRI;
   retrieving information from the selected web site address; and
   generating for display the information from the selected web site address.

15. A method for time-shifting video and program related information (PRI) in an enhanced television program, comprising the steps of:
   receiving a video signal;
   receiving a trigger and a suspend flag in the video signal;
   in response to receiving the trigger, launching, without user input, an application to retrieve PRI;
   generating for display a video program contained in the video signal in a first portion of a display screen and the PRI in a second portion of the display screen;
   detecting the suspend flag in the video signal after the PRI is retrieved, wherein the suspend flag is not the PRI; and
   storing, without user input, the video signal in a time-shifting apparatus and continuously displaying a still frame from the stored video signal when the suspend flag is received.

* * * * *